May 18, 1926.
E. H. WHITE
HEAT REGULATOR FOR HEATING SYSTEMS
Filed March 14, 1924    2 Sheets-Sheet 1
1,585,451
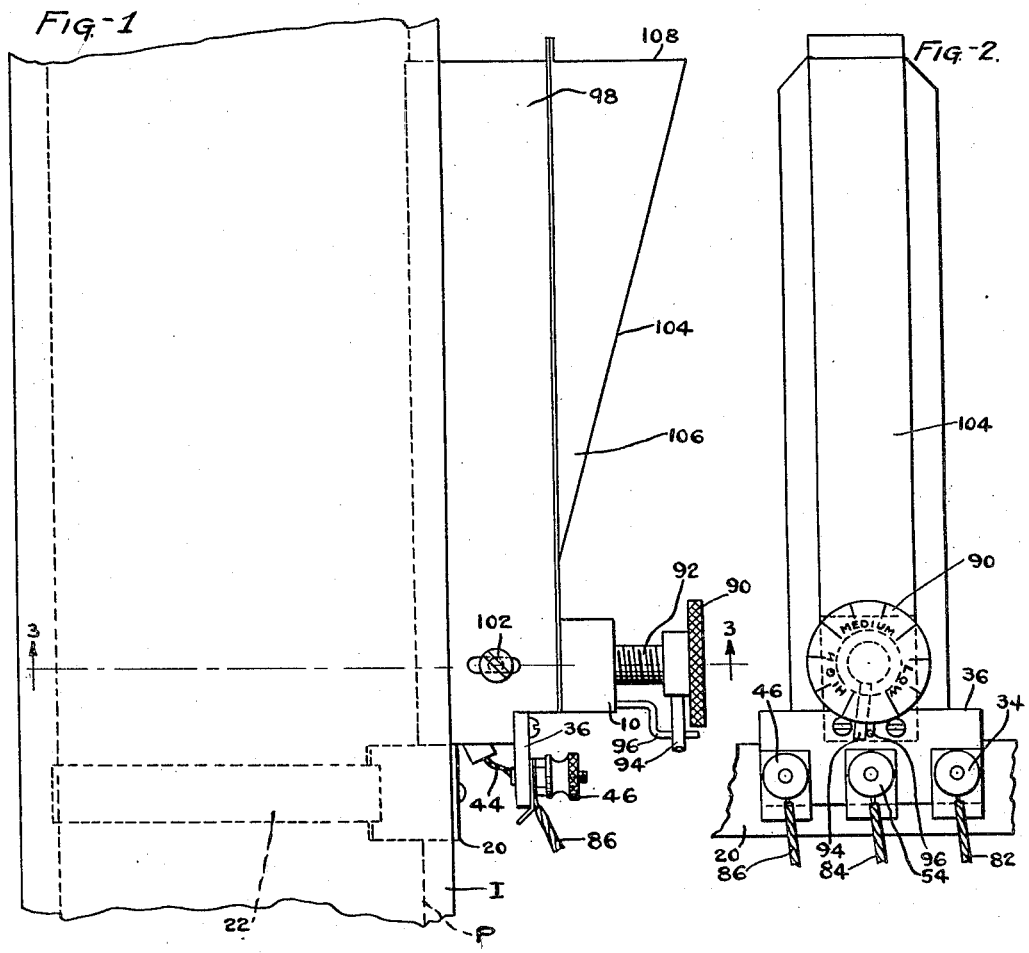
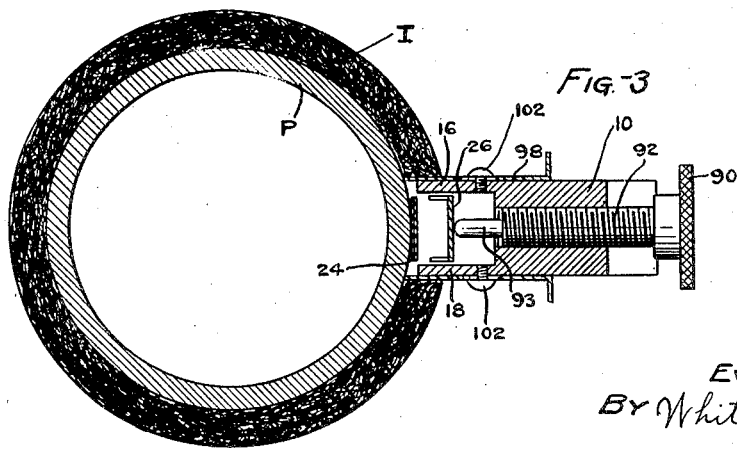
INVENTOR:
EVERETT H. WHITE.
By Whiteley and Ruckman
ATTORNEYS.

May 18, 1926.  1,585,451
E. H. WHITE
HEAT REGULATOR FOR HEATING SYSTEMS
Filed March 14, 1924    2 Sheets-Sheet 2
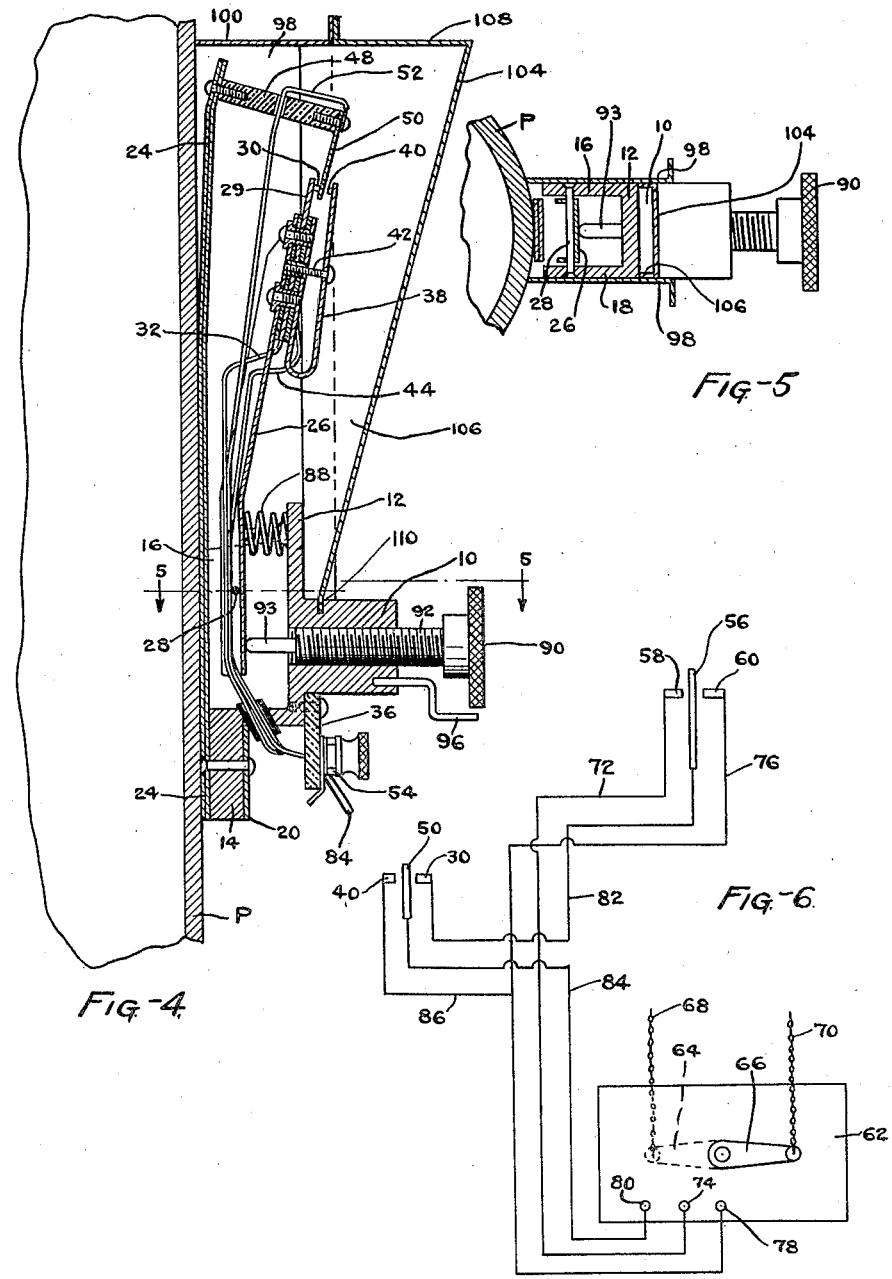
INVENTOR:
EVERETT H. WHITE.
BY Whiteley and Ruckman
ATTORNEYS.

Patented May 18, 1926.

1,585,451

UNITED STATES PATENT OFFICE.

EVERETT H. WHITE, OF ST. PAUL, MINNESOTA.

HEAT REGULATOR FOR HEATING SYSTEMS.

Application filed March 14, 1924. Serial No. 699,281.

My invention relates to heat regulators for heating systems, and more particularly to regulators for heating systems in which hot water is employed as the heating medium. It is customary in systems of this kind to employ an electric motor to operate a shaft for controlling the degree of heat applied in the heating system, the motor being caused to operate by means of a thermostat positioned in one of the rooms of the building. When the room is cold and the heat is coming on, it requires considerable time before the temperature of the room is raised to a point where the thermostat will expand sufficiently to cause the heat controlling device associated with the heat generator to move into its check or "off" position. The result is that the hot water of the system becomes heated to a degree much greater than is required to maintain the rooms at a desired temperature so that the room eventually becomes overheated. An object of my invention is to overcome this difficulty by providing an additional thermostatic controlling device which is applied directly to a hot water pipe leading from the heat generator or to the outside of the generator itself, and which functions in connection with the customary room thermostat in such manner that when the water reaches the desirable maximum degree the heat controlling device will be operated into checking position in spite of the fact that the temperature of the rooms has not yet reached the degree at which they are ultimately to be maintained. It is a further object of my invention to provide a thermostatic controlling device of this character which will be operated directly by the temperature of the water without the necessity of drilling or tapping into the hot water pipe or boiler for the purpose of placing a thermostatic element on the inside or in direct contact with the water. It will be understood that my thermostatic controlling device may be applied to a hot water tank for operating a heat controlling device associated with the heat generator. It will be apparent therefore, that the expression "hot water container associated with the heat generator" may refer to a hot water pipe or to a hot water chamber of the heat generator or to a hot water tank.

The full objects and advantages of my invention will appear in connection with the detailed description, and the novel features of my inventive idea will be particularly pointed out in the claims.

In the accompanying drawings which illustrate a practical embodiment of my invention, Fig. 1 is a side elevational view of the device showing it attached to a hot water pipe. Fig. 2 is a front elevational view of the device. Fig. 3 is a view in horizontal section on the line 3—3 of Fig. 1. Fig. 4 is a view in vertical section. Fig. 5 is a view in horizontal section on the line 5—5 of Fig. 4. Fig. 6 is a wiring diagram.

As shown in the drawings, I provide a base member 10 preferably in the form of a casting having an upward extension 12 and a downward extension 14. This base member constitutes a support for the operative elements of the device. As will be apparent from Figs. 4 and 5, the upper portion of the base is hollowed out back of the extension 12 and the latter is joined to the lower extension 14 by side members 16 and 18. Secured to the front of the extension 14 is a plate 20, the ends of which are bent backwardly as will be apparent from Fig. 1. A strip 22 is attached to the plate 20 and this strip is adapted to encircle a hot water pipe P which leads from the furnace. Pipes of this character are ordinarily covered with a layer of heat insulating material I. To apply the device to the pipe, a small portion of this insulating material is removed as will be apparent from Fig. 3 so that the lower end of a thermostatic bar 24 may be clamped in metallic contact with the pipe P. The thermostatic bar 24 is of the customary two-metal type and its lower end is secured to the rear side of the extension 14. A channel-like arm 26 is pivotally attached near its lower end by a pin 28 which passes through the side flanges of the arm 26, and through the side members 16 and 18. Insulatively mounted on the upper end of the arm 26 is a flat metal plate 29 carrying a contact point 30 which constitutes the "on" contact. The plate 29 is connected by an insulated wire 32 with a binding post 34 mounted on a plate 36 of insulating material secured to the base. Insulatively mounted on the upper end of the arm 26 is a metal plate 38 which is bent back upon itself and at its free end carries a contact point 40 which is the "off" contact and is spaced from the contact point 30 the distance from which may be varied by an adjusting screw 42. The plate 38 is connected by an insulated wire 44 with a binding post 46 mounted on the plate 36. The upper end of the thermostatic bar 24 carries a post 48 of insulating material upon the outer end of which is a depending metallic finger 50 connected by an insulated wire 52 with a binding post 54 mounted on the plate 36. The manner in which my device is connected up with a customary room thermostat will be understood from the wiring diagram shown in Fig. 6 in which 56 designates the thermostatic bar, 58 designates the "on" contact, and 60 designates the "off" contact of the room thermostat. A regulating motor 62 has arms 64 and 66 connected in the usual manner by chains 68 and 70 with the dampers or other heat controlling device of the heating system. The "on" contact 58 is connected by a wire 72 with a post 74 on the motor and the "off" contact 60 is connected by a wire 76 with a post 78 on the motor. In the customary arrangement, the thermostatic bar 56 is connected by a wire with a post 80 on the motor. To adapt the arrangement for use with my improved device, the last mentioned wire is cut into two parts 82 and 84, and the wire 82 which is connected at one end with the thermostatic element 56 is connected at its opposite end with the "on" contact 30 while the wire 84 which is connected at one end with the post 80 is connected at its other end with the thermostatic element 50. The "off" contact 40 is connected by a wire 86 with the wire 76 which connects the "off" contact 60 with the motor post 78. In regard to the wiring diagram, it will be apparent that it is not necessary for an understanding of the circuits to illustrate the binding posts 34, 46, and 54. It will be readily understood that the wire 32 constitutes part of the circuit connection 82, the wire 44 constitutes part of the circuit connection 86, and the wire 52 constitutes part of the circuit connection 84. When the thermostatic element 50 expands sufficiently to bring it into engagement with the "off" contact 40 a circuit is completed to the "off" contact post 78 on the motor. It will be noted that since the wire 86 is connected to the wire 76, ringing of the element 50 into engagement with the "off" contact 40 has the same effect to operate the motor as does ringing of the thermostatic element 56 into engagement with the "off" contact 60. The pivoted arm 26 is normally urged away from the extension 12 by a spring 88 to a position which corresponds to the low temperature position indicated on a dial 90 having a milled periphery so that it may be readily turned. The dial 90 is secured to the forward end of a screw-threaded rod 92 which engages a threaded opening in the base 10. The rear end 93 of the member 92 is reduced and engages the arm 26 below its pivotal point 28. The head of the member 92 carries an outward projection 94 adapted to cooperate with a stop arm 96 carried by the base. When the dial is turned from the low temperature position shown in Fig. 2, the upper portion of the arm 26 will be moved forwardly and when the projection 94 comes into engagement with the right hand side of the stop 96, the device will then be set for high temperature. The thermostatic bar 24 is protected by an enclosing casing having two flanged side walls 98 connected at the top by a connecting portion 100. As will be apparent from Fig. 3, the side walls 98 are attached to the base 10 by screws 102 passing through slots in the side walls whereby the casing may be adjusted accordingly to the size of the hot water pipe so that the bar 24 will have metallic contact with said pipe regardless of its size. The front portion of the casing consists of a front member 104 to which are attached two triangular side members 106. As best shown in Fig. 4, a member 108 extends rearwardly from the upper end of the member 104 and the lower end of the member 104 has a bent portion 110 adapted to engage in a slot in the base 10. The side members 106 fit frictionally within the side members 98 so that the front portion of the casing may be readily removed in order to adjust the contact point 40 with relation to the contact point 30.

The operation and advantages of my invention will be readily understood in connection with the foregoing description. Unless the water in the hot water pipe has reached the desired maximum temperature for which the hot water pipe thermostat is set, the thermostatic bar 50 will be in engagement with the "on" contact 30 and the room thermostat will operate precisely the same as though the second thermostat were not present. It is only when the thermostatic bar 50 expands and engages the "off" contact 40 that the second thermostat functions and caused the dampers or other heat controlling devices to be moved to check the fire. As soon as the temperature of the water falls below the permissible maximum, the bar 50 engages the contact 30 and the dampers or other heat controlling device will then be controlled entirely from the room thermostat. It will be noted that when the thermostatic bar 24 is in contracted condition the contact finger 50 is in engagement with the "on" contact point 30. Therefore, when the dial 90 is turned to move the arm 26 toward the right, as viewed in Fig. 4, the upper end of the bar 24 will be flexed toward the right so that a higher temperature is required to move the finger 50 over into engagement with the contact point 40. My thermostatic heat regulator has in practice proved to be an efficient, inexpensive and dependable device for controlling the temperature of a hot water heating system, and it can be used in connection with my type of electric heat regulator. It can be installed in a short time without draining the boiler while the heating plant is in full operation. By a single adjustment of the screw 42, the device may be set to operate on a range from 4° to 30° between "off" and "on". The function of the device is to automatically shut off the heat whenever the temperature of the water in the boiler reaches a maximum point. This maximum point may in practice be varied to any degree from 80° to the boiling point by moving the dial.

I claim:

1. A heat regulator for heating systems comprising a thermostatic member secured in metallic contact with the outside surface of a hot water container associated with the heat generator, two spaced contact points insulatively mounted adjacent said thermostatic member, a contact finger insulatively mounted on said thermostatic member and adapted to be moved into engagement with one or the other of said contact points by the expansion and contraction of said thermostatic member, and electric connections for said contact finger and points whereby the degree of heat applied in the heating system is controlled.

2. A heat regulator for heating systems comprising a thermostatic member secured in metallic contact with the outside surface of a hot water container associated with the heat generator, two spaced contact points insulatively mounted adjacent said thermostatic member, a contact member adapted to be moved into engagement with one or the other of said contact points by the expansion and contraction of said thermostatic member, and electric connections for said contact member and points whereby the degree of heat applied in the heating system is controlled.

3. A heat regulator for heating systems comprising a support, a thermostatic member attached to said support, means for securing said support to a hot water container associated with the heat generator with said member in metallic contact with the outside of said container, an arm carried by said support, two spaced contact points insulatively mounted on said arm, a contact finger insulatively mounted on said thermostatic member and adapted to be moved into engagement with one or the other of said contact points by the expansion and contraction of said thermostatic member, and electric connections for said contact finger and contact points whereby the degree of heat applied in the heating system is controlled.

4. A heat regulator for heating systems comprising a support, a thermostatic bar attached to said support, means for securing said support to a hot water container associated with the heat generator with the attached end of said bar in metallic contact with the outside of said container, an arm pivotally attached to said support, two spaced contact points insulatively mounted on said arm, a spring tending to urge the contact carrying portion of said arm towards said container, a dial carrying member movably mounted in said support whereby said contact carrying portion may be moved away from said container in opposition to the force exerted by said spring, a contact finger insulatively mounted on said thermostatic bar and adapted to be moved into engagement with one or the other of said contact points by the expansion and contraction of said thermostatic bar, and electric connections for said contact finger and contact points whereby the degree of heat applied in the heating system is controlled.

5. A heat regulator for heating systems comprising a support, a thermostatic member attached to said support, means for securing said support to a hot water container associated with the heat generator with said thermostatic member in metallic contact with the outside of said container, a casing for protecting said thermostatic member attached to said support, means whereby the position of said casing may be adjusted so that said thermostatic element will be maintained in metallic contact with said container for different sizes thereof, and means associated with said thermostatic element for controlling the degree of heat applied in the heating system.

6. A heat regulator for heating systems comprising a support, a thermostatic bar attached to said support, means for securing said support to a hot water container associated with the heat generator with said thermostatic bar in metallic contact with the outside of said container, an arm carried by said support, two spaced contact points insulatively mounted on said arm, means whereby the distance between said contact points may be varied, a two-part casing for protecting said thermostatic bar attached to said support, one of the parts of said casing being readily removable to permit adjustment of said contact points, a contact finger insulatively mounted on said thermostatic bar and adapted to be moved into engagement with one or the other of said contact points by the expansion and contraction of said thermostatic bar, and electric connections for said contact finger and contact points whereby the degree of heat applied in the heating system is controlled.

In testimony whereof I hereunto affix my signature.

EVERETT H. WHITE.